United States Patent
Casey et al.

(10) Patent No.: US 8,964,531 B2
(45) Date of Patent: Feb. 24, 2015

(54) RESILIENT ATTACHMENT TO PROVIDER LINK STATE BRIDGING (PLSB) NETWORKS

(71) Applicant: Rockstar Consortium US LP, Plano, TX (US)

(72) Inventors: Liam Casey, Ottawa (CA); David Allan, Ottawa (CA); Nigel L. Bragg, Weston Colville (GB); Jerome Chiabaut, Ottawa (CA); Peter Ashwood Smith, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 14/195,320

(22) Filed: Mar. 3, 2014

(65) Prior Publication Data

US 2014/0177433 A1     Jun. 26, 2014

Related U.S. Application Data

(63) Continuation of application No. 13/586,620, filed on Aug. 15, 2012, which is a continuation of application No. 12/340,174, filed on Dec. 19, 2008, now Pat. No. 8,270,290.

(51) Int. Cl.
*G01R 31/08* (2006.01)
*H04L 12/24* (2006.01)
(Continued)

(52) U.S. Cl.
CPC ............ *H04L 41/0654* (2013.01); *H04L 45/02* (2013.01); *H04L 45/245* (2013.01);
(Continued)

(58) Field of Classification Search
USPC ............ 370/218, 222, 252, 255, 397, 395.31, 370/409
See application file for complete search history.

(56) References Cited

U.S. PATENT DOCUMENTS

| 7,269,132 B1 | 9/2007 | Casey et al. |
| 7,719,958 B1 | 5/2010 | Azimi et al. |

(Continued)

FOREIGN PATENT DOCUMENTS

| RU | 2 271 614 C2 | 7/2005 |
| WO | 2005011210 A1 | 2/2005 |

OTHER PUBLICATIONS

IEEE Standard 802.3 (Clause 43), "Carrier Sense Multiple Access Method With Collision Detection (CSMA/CD) Access Method and Physical Layer Specifications", 2002, Section 3, pp. 282-345.
(Continued)

*Primary Examiner* — Alvin Zhu
(74) *Attorney, Agent, or Firm* — Pearne & Gordon LLP

(57) ABSTRACT

A system for interfacing a client system in a first network domain with a Provider Link State Bridging (PLSB) domain includes at least two Backbone Edge Bridges (BEBs) of the PLSB domain. Each BEB is an end-point of a connection in the first network domain to the client system and an end-point of at least a unicast path in the PLSB domain. An inter-node trunk is provided in the PLSB domain for interconnecting the BEBs. A phantom node is defined in the PLSB domain and is notionally located on the inter-node trunk. Each of the BEBs is configured such that: an ingress packet received from the client system via the connection in the first network domain is forwarded through a path notionally rooted at the phantom node; and an egress packet destined for the client system is forwarded to the client system through the connection in the first network domain.

42 Claims, 4 Drawing Sheets

(51) Int. Cl.

| | | |
|---|---|---|
| *H04L 12/751* | (2013.01) | |
| *H04L 12/709* | (2013.01) | |
| *H04L 12/753* | (2013.01) | |
| *H04L 12/707* | (2013.01) | |
| *H04L 12/66* | (2006.01) | |
| *H04L 12/891* | (2013.01) | |
| *H04L 12/741* | (2013.01) | |

(52) U.S. Cl.
 CPC ............... *H04L 45/48* (2013.01); *H04L 45/22* (2013.01); *H04L 12/66* (2013.01); *H04L 47/41* (2013.01); *H04L 45/74* (2013.01); *H04L 2212/0025* (2013.01); *Y02B 60/33* (2013.01)
 USPC .......... 370/218; 370/221; 370/225; 370/255; 370/397; 370/395.31

(56) References Cited

U.S. PATENT DOCUMENTS

| | | | |
|---|---|---|---|
| 8,504,727 | B2 | 8/2013 | Mohan et al. |
| 2002/0071442 | A1 | 6/2002 | Li |
| 2003/0097470 | A1 | 5/2003 | Lapuh et al. |
| 2004/0215817 | A1 | 10/2004 | Qing et al. |
| 2005/0007951 | A1 | 1/2005 | Lapuh et al. |
| 2007/0237172 | A1 | 10/2007 | Zelig et al. |
| 2008/0071961 | A1 | 3/2008 | Higuchi et al. |
| 2008/0172497 | A1 | 7/2008 | Mohan et al. |
| 2008/0181196 | A1 | 7/2008 | Regan et al. |
| 2008/0219268 | A1 | 9/2008 | Dennison |
| 2010/0064086 | A1 | 3/2010 | McCarty et al. |

OTHER PUBLICATIONS

IEEE 802.3-2005, Section 43, pp. 285-387, Copyright 2005.

U.S. Appl. No. 11/964,478, filed Dec. 26, 2007, Inventors: Jerome Chiabaut, David Allan and Nigel Bragg, Title: Tie-Breaking in Shortest Path Determination, 26 pages of specification/claims/abstract and 8 pages of drawings.

Roger Lapuh, Dinesh Mohan, Richard Mcgovern, Internet draft entitled "Split Multi-Link Trunking (SMLT)" http://tools,ietf.org. html/draft-lapuh-network-smlt-07, Date Created: Jul. 7, 2008, 20 page printout.

Lapuh R et al: "Split Multi-Link Trunking (SMLT)", Internet Citation, Jun. 2003, XP002298970, Retrieved from the Internet: URL:http://mirrors.isc.org/pub/www.watersprings.org/pub/id/draft-lapuh-network-smlt-02.txt [retrieved on Oct. 4, 2003].

Roger Lapuh Network Working Group Dinesh Mohan Richard McGovern Nortel: Split Multi-Link Trunking (SMLT); draft-lapuh-network-smlt-08.txt, Split Multi-Link Trunking (SMLT); Draft-Lapuh-Network-Smlt-08.Txt, Internet Engineering Task Force, IETF; Standardworkingdraft, Internet Society (ISOC) 4, Rue Des Falaises Ch- 1205 Geneva, Switzerland, No. 8, Jul. 7, 2008, XP015059390.

RESILIENT ATTACHMENT TO PROVIDER LINK STATE BRIDGING (PLSB) NETWORKS

CROSS-REFERENCE TO RELATED APPLICATIONS

This application is a continuation application based on U.S. application Ser. No. 13/586,620 filed Aug. 15, 2012, which is a continuation application of U.S. application Ser. No. 12/340,174 filed Dec. 19, 2008 which issued as U.S. Pat. No. 8,270,290 on Sep. 18, 2012, the entire contents of which are hereby incorporated herein by reference.

MICROFICHE APPENDIX

Not Applicable.

TECHNICAL FIELD

The present invention relates to management of traffic forwarding in packet networks, and in particular to methods of resiliently attaching Ethernet to Provider Link State Bridging (PLSB) networks.

BACKGROUND OF THE INVENTION

Network operators and carriers are deploying packet-switched communications networks in place of circuit-switched networks. In packet-switched networks such as Internet Protocol (IP) networks, IP packets are routed according to routing state stored at each IP router in the network. Similarly, in Ethernet networks, Ethernet frames are forwarded according to forwarding state stored at each Ethernet switch in the network. The present invention applies to communications networks employing any Protocol Data Unit (PDU) based network and in this document, the terms "packet" and "packet-switched network", "routing", "frame" and "frame-based network", "forwarding" and cognate terms are intended to cover any PDUs, communications networks using PDUs and the selective transmission of PDUs from network node to network node.

Multi-Link Trunking, which is described in IEEE 802.3-2005 (Section 43), provides a method by which two peer Client Systems (CSs) connected by two or more point-to-point full duplex links, can cooperate to treat the parallel links as a single "link", referred to as a Link Aggregation Group (LAG). As may be seen in FIG. 1, this is accomplished by implementing an aggregator (AG) 4 at each peer CS 6. The Aggregator 4 is logically interposed between the Media Access Control (MAC) Client and the MAC layer (not shown) of the involved network node, and generally comprises a Distributor for distributing frames to individual ports for transmission; a Collector for collecting received frames from individual ports and forwarding them to the MAC Client; and a controller for managing the state of the link group. Thus, at a sending CS 6a, the distributor routes packets from the MAC Client to a selected one of the LAG links 8, in such a way as to achieve desired load balancing and resiliency. At the receiving CS 6b, the collector forwards packets received through the LAG links 8 to the MAC Client. With this arrangement, the existence of multiple links 8 within the LAG 2 is rendered transparent to each of the respective MAC clients of the peer CSs 6.

Multi-Link Trunking provides increased bandwidth and inherent resiliency between two directly connected peer nodes beyond that which can be achieved with a single link but in a form that preserves key properties that are associated with a single link. It would therefore be desirable to extend Multi-Link Trunking across a network. That is, it would be desirable to set up an "extended link aggregation group" between a pair of client systems, in which each "link" of the extended link aggregation group traverses an independent (and physically diverse) set of links and nodes between the two involved client systems. Preferably, the "extended link aggregation group" would be configured in such a way that each of the client systems would utilize conventional MAC Client and Aggregator functions as defined in IEEE 802.3-2005 (Section 43).

Split Multi Link Trunking (SMLT) is a technique developed by Nortel Networks Limited, and is described in co-assigned U.S. Pat. No. 7,269,132 and an internet draft entitled "Split Multi-Link Trunking (SMLT)" http://tools.ietf.org/html/draft-lapuh-network-smlt-07, which extends Multi-Link Trunking. As may be seen in FIG. 2, Split Multi Link Trunking (SMLT) replaces one of the peer CSs 6 with a pair of physical Ethernet Switches (ESs) 10. Because the link aggregation group (LAG) has been split across two physical switches, it may be referred to as a Split Link Aggregation Group (SLAG) 12. At the "split" end 14 of the SLAG 12, the aggregator and MAC Client functions (of the replaced peer CS 6b) are distributed between the two SMLT-enabled ESs 10, so that the single aggregator 4a and CS 6a at the other end of the SLAG 12 are not aware of the split. A special link 16 (which itself may be an aggregated group) is provided between the two SMLT-enabled ESs 10, to enable coordination between the respective parts of the distributed aggregator and MAC client functions. This special link 16 is referred to as an Inter-Switch Trunk (IST). Applicant's co-assigned U.S. Pat. No. 7,269,132 teaches methods by which conventional MAC client and Aggregator functions can be retained at the "joined" end of the SLAG group, by representing the peer ESs 10 at the split end 14 of the SLAG 12 as a single phantom node (not shown in FIG. 2).

As may be appreciated, SMLT enables a resilient connection between a client system (CS) and an Ethernet domain, by enabling traffic to or from the CS to be routed through the pair of SMLT enabled Ethernet switches. Thus it provides a "first step" in establishing an extended link aggregation group which spans an Ethernet domain, by enabling each CS to connect to the Ethernet domain via a respective pair of SMLT-enabled ESs. However, there is no simple way of extending the link aggregation group across the Ethernet domain between the peer SMLT-enabled ESs and, for example, a second set of peer SMLT-enabled ESs supporting a second CS.

As noted above, the conventional MAC client and Aggregator functions can be retained at the "joined" end of the SLAG group 12, by representing the peer ESs 10 at the split end of the SLAG 12 as a single "phantom" node. The use of the phantom node also allows Spanning Tree Protocol (STP) to be used in a conventional manner to set up a connection through the Ethernet domain from the peer ESs 10 of the SLAG 12 to a desired destination address (such as counterpart peer ES of another SLAG). In principle, this could enable respective paths to be set up through each of the peer ESs 10. However, in order to prevent looping, and consequent failure of the network, one of these paths must be logically disabled. As a result, while packets sent from a CS 6 can arrive at either of the peer ESs 10 of the SLAG 12, both packet flows will be combined into a single connection for transport across the Ethernet domain.

Techniques for extending a link aggregation group across a network which overcome at least some of the above-noted issues remain highly desirable.

SUMMARY OF THE INVENTION

Thus, an aspect of the present invention provides a method of interfacing a client system in a first network domain with a Provider Link State Bridging (PLSB) network domain. At least two Backbone Edge Bridges (BEBs) of the PLSB domain are provided. Each BEB is an end-point of a connection in the first network domain to the client system and an end-point of at least a unicast path defined within the PLSB domain. An inter-node trunk is provided in the PLSB domain for interconnecting the at least two BEBs. A phantom node is defined in the PLSB domain. The phantom node has a unique address in the PLSB domain and is notionally located on the inter-node trunk one hop from each of the BEBs. Forwarding state is installed in each of the BEBs such that: an ingress packet received from the client system via the connection in the first network domain is forwarded on a path notionally rooted at the phantom node; a subscriber packet received from the client system via the inter-BEB link is forwarded through a path nominally rooted at the phantom node; and an egress subscriber packet destined for the client system is forwarded to the client system through the connection in the first network domain.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides a method of utilizing link aggregation as a form of resilient access to a PLSB network. Embodiments of the invention are described below, by way of example only, with reference to FIGS. 3-7c.

In very general terms, the present invention enables resilient connection to a network domain whereby the assignment of traffic by a client system (CS) to the plurality of links of a Split Link Aggregation Group (SLAG), in the upstream direction, is arbitrary, and extension of such resiliency across a network domain by extending parallel connections though the domain to the desired egress points from the network domain. These egress points may be other Ethernet Switches (ESs) or a virtualized CS in a singular ES that proxies the function on behalf of the single attached client. In preferred embodiments, this is accomplished by providing a set of two or more peer edge nodes of the network domain, each one of the set of peer edge nodes including at least one local Link Aggregation Group (LAG) port hosting a corresponding LAG link connected to the CS; and at least one port hosting an inter-node trunk connecting the node to each of the other ones of the set of peer edge nodes. A path is computed through the network domain from each peer edge node to at least one predetermined destination address, for carrying traffic to or from the CS. A peer edge node is then controlled such that ingress traffic received from the CS is forwarded via the path to the at least one predetermined destination address; whereas egress traffic destined for the CS is forwarded to the CS via a local LAG port, if any local LAG port is operational, and otherwise via the inter-node trunk to another one of the set of peer edge nodes.

Figure 3:
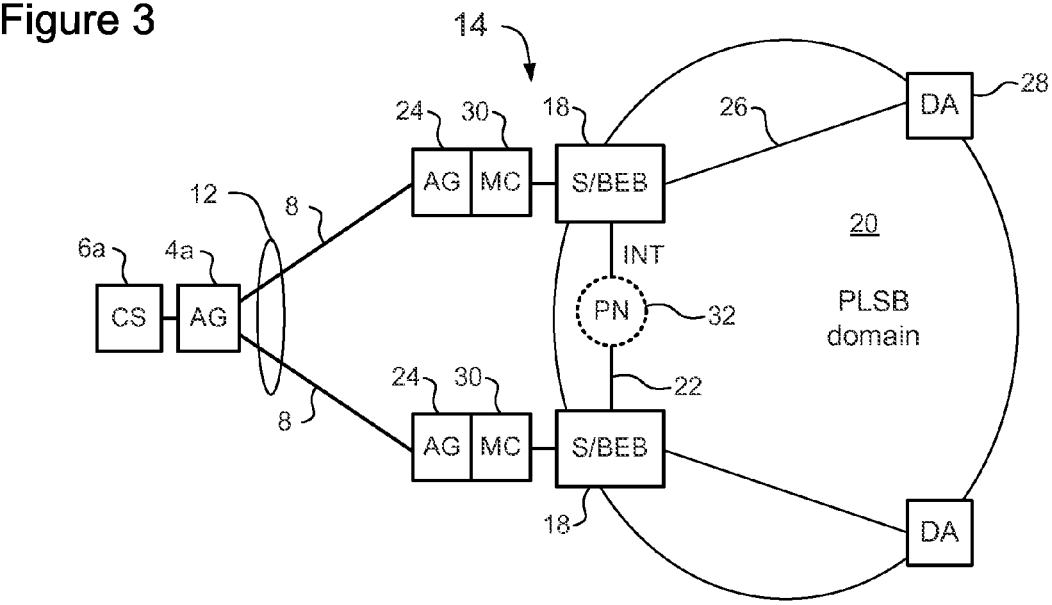
FIG. 3 is a block diagram schematically illustrating a method of interfacing a Client System and a PLSB domain in accordance with a representative embodiment of the present invention.

FIG. 3 schematically illustrates a network in which this method is implemented in a Provider Link State Bridging (PLSB) network domain.

Figure 1:
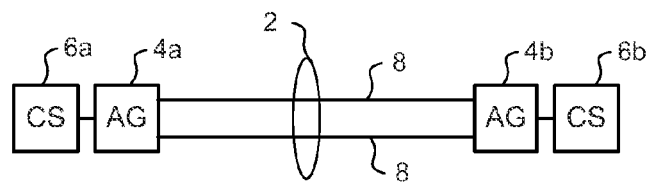
FIG. 1 is a block diagram schematically illustrating a conventional Link Aggregation Group (LAG) known in the prior art.
Figure 2:
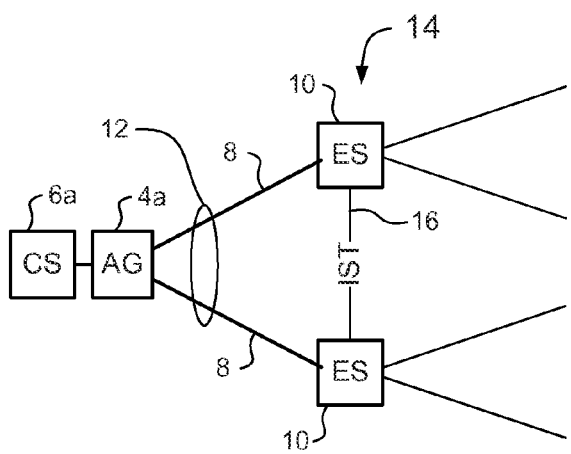
FIG. 2 is a block diagram schematically illustrating a conventional Split Link Aggregation Group (SLAG) known in the prior art.

The embodiment of FIG. 3 is topologically similar to the Split Link Aggregation Group (SLAG) described above with reference to FIG. 2, in that an Ethernet client system (CS) 6 is connected to two or more switch nodes. However, the embodiment of FIG. 3 differs from the arrangement of FIG. 2 in that the SMLT-enabled Ethernet switches of FIG. 2 are replaced by edge nodes 18, referred to herein as Backbone Edge Bridges (BEBs), of a Provider Link State Bridging (PLSB) domain 20. The BEBs 18 are interconnected by an inter-node trunk (INT) 22, which can be a conventional unicast or multicast connection in the PLSB domain 20, to enable coordination between the BEBs 18 as will be described in greater detail below. Thus the inter-node trunk (INT) 22 is analogous to the Inter-Switch Trunk (IST) 16 described above with reference to FIG. 2.

As noted above, it is desirable that the CS 6 should be able to perform conventional MAC Client and Aggregator functions as defined in IEEE 802.3-2005 (Section 43). This can be accomplished, without disturbing the conventional PLSB functionality of the BEBs 18, by distributing the MAC client functionality of conventional Multi Link Trunking across the involved BEBs 18. There are three types of functions that need to be distributed, namely: the LAG Aggregator functions; advertising the CS 6 to realize the paths (and/or trees) required for traffic forwarding to or from the CS 6; and the BEB service packet forwarding function. Each of these are described in greater detail below.

Distributing the LAG Aggregator Functions

Distribution of the LAG aggregator function may be implemented using methods known, for example from Split Multi Link Trunking (SMLT). Thus, at the split end 14 of the split link aggregation group (SLAG) 12, each peer BEB 18 is provided with a respective Aggregator instance 24, which included all three components (i.e. the Controller, Distributor and the Collector).

As in Split Multi Link Trunking (SMLT), the respective Controller instances provided at each peer BEB 18 cooperate to manage the state of the SLAG 12, and provide that state information to the Distributor instances in each BEB 18. Thus, for example, each BEB 18 can be considered to have three sets of ports associated with the SLAG 12, namely: one or more local LAG ports connected to the CS 16; one or more NT ports for exchanging messages with peer BEBs 18; and one or more PLSB ports for traffic forwarding through a path (or tree) 26 to destination address(es) 28 in the PLSB domain 20 20. In the case of an extended LAG spanning the PLSB domain 20 20, the path (or tree) 26 will extend to one or more BEBs hosting the destination CS (not shown) in a manner generally mirroring that illustrated in FIG. 3. The controller instance in each distributed aggregator 24 manages the state of each of its local LAG ports, and broadcasts that state information to the Distributor instances in each peer BEB 18 via suitable control signalling though the INT 22.

In normal operation, the Distributor instance in each BEB will distribute frames destined for the CS only to its local LAG ports. However, if those local ports are not operational, and at least one LAG port on a peer BEB is operational, then the Distributor instance can forward frames through the NT 22 to its peer Distributor (See FIG. 7a).

A Collector instance only passes frames from local LAG ports to its MAC client, as in conventional MLT and SMLT methods.

In a conventional LAG 2, service level packet forwarding is performed by a MAC client associated with each Aggregator 4. In the embodiment of FIG. 3, the Aggregator function is distributed over the peer BEBs 18, by means of respective Aggregator instances 24 installed in each BEB, as described above. In such cases, it is efficient to also distribute the MAC client function over the BEBs 18, using corresponding MAC Client instances 30.

For ease of description, it is convenient to refer to the peer BEBs 18 supporting the split end 14 of the SLAG 12 as "Split BEBs" (S/BEBs). This terminology will be used in the following description.

Advertising the Client System to the PLSB Domain

In general, there are two techniques that can be used to advertise the client system 6 to the PLSB domain 20 so as to compute the path (or tree) 26 through the PLSB domain 20 from each S/BEB 18 to any destination address. The first technique described below is to represent the aggregation of the S/BEBs 18 as a phantom node (PN) 32 notionally located on the INT 22 one hop away from each of the S/BEBs 18. The second technique described is to control each of the peer S/BEBs 18 to independently compute a set of one or more paths/trees 26 for the SLAG 12, and then select a path/tree from the computed set of paths/trees so as to maximize the diversity between the paths/trees selected by all of the peer S/BEBs 18.

As is known in the art, conventional PLSB path computation techniques can yield more than one equal-cost paths or trees between a source address and any given destination address(es). With tie breaking techniques known, for example, from U.S. patent application No. 11/964,478 filed Dec. 26, 2007, a packet forwarder on a standard BEB would normally select one of these paths or trees, so that traffic is encapsulated and forwarded over the PLSB domain 20 via the selected path or tree. For convenient reference, in a scenario in which there are two equal-cost paths/trees, these two paths/trees may be referred to as a "High" path/tree and a "Low" path/tree. In a scenario in which there are more than two equal-cost paths/trees, a different ranking system may be used, but the general principal remains the same.

Advertising the Client System to the PLSB Domain Using a Phantom Node

In the context of the present invention, it is necessary to advertise a Backbone MAC (B-MAC) address of the Phantom Node (PN) 32 as the Destination and Source addresses (B-DA, B-SA) of unicast paths and multicast trees that convey subscriber traffic to or from the CS 6.

According to the LAG description in IEEE 802.3 (2005) Section 43, an Aggregator has its own MAC address, and this address becomes the MAC address of the MAC client that uses the Aggregator. While a system supporting multiple Link Aggregations could have a distinct MAC address for each, there does not seem to be any prohibition against using the same MAC address for all Aggregated Links on a system. Thus, for example, the respective aggregator instances 24 on each of the S/BEBs 18 may all have the same MAC address, if desired. In some embodiments, this common MAC address can be used as the B-MAC address (that is, the address in the PLSB domain 20) of the Phantom Node 32.

As is known in the art, Link State Packets (LSPs) contain both a sequence number and an age field. Each S/BEB 18 must forward Phantom node LSPs that appear as if they had arrived on its INT 22 port from the Phantom node 32. Since the PN 32 does not actually exist, one way of doing this is to designate one of the S/BEBs 18 as being responsible for generating any given LSP on behalf of the PN 32 (and setting the sequence number and age fields accordingly) while the other S/BEB(s) merely forwards it. The designated S/BEB 18 may be selected at the time of provisioning the S/BEBs 18, or at any other suitable time. Selection of which one of the S/BEBs 18 is to be designated as being responsible for generating any given LSP on behalf of the PN 32 may be based on any suitable criteria. For example, in some embodiments, the S/BEB 18 having the lowest address may be selected as the designated S/BEB.

Conventional IS-IS LSPs generated by a BEB contain the respective I-SIDs for any/all MAC Clients hosted by the BEB. Accordingly, LSPs generated by the designated S/BEB, on behalf of the PN 32, preferably include the respective I-SIDs assigned to each of the MAC Client instances 30 on the S/BEBs 18.

Based upon their own LSPs, and LSPs flooded to them, the S/BEBs 18 must calculate the shortest paths and trees which are notionally rooted at the PN 32 and extend to every other advertised BEB in the PLSB domain 20. In one embodiment of PLSB, of all possible shortest paths from each node, two are chosen for use: the one that scores highest in the tie-breaking procedure and one that scores lowest. While unicast paths are I-SID independent, a pair of multicast trees (a "high" tree and a "low" tree) must be generated for each I-SID that the Phantom Node 32 supports. In cases where every destination BEB supports every I-SID, then there will only be one pair of distinct trees. Otherwise two or more pairs of trees will be generated, which will differ from each other in the pruned back links for leaf BEBs that don't support any particular I-SID. Note also that S/BEBs 18 must advertise I-SID(s) and calculate paths for their own Backbone MAC addresses only if there are client systems individually attached to one but not the other member of the S/BEB 18 pair; that is, if there is a mixture of multi-homed and singly homed Client Systems on the same BEB.

Figure 4A:
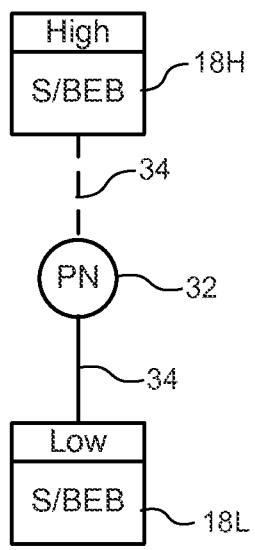
FIGS. 4a-4d are block diagrams schematically illustrating respective alternative arrangements of trees notionally rooted at the phantom node in the embodiment of FIG. 3.
Figure 4B:
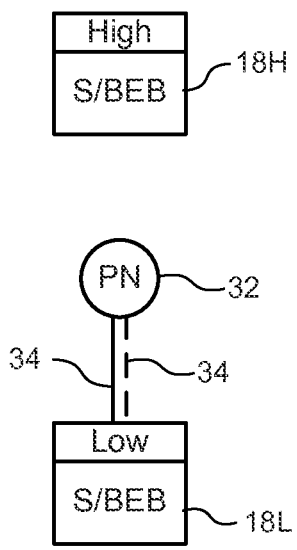
Figure 4C:
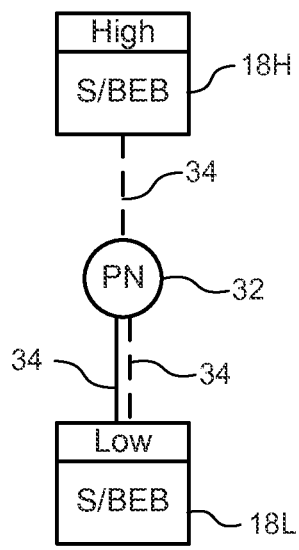
Figure 4D:
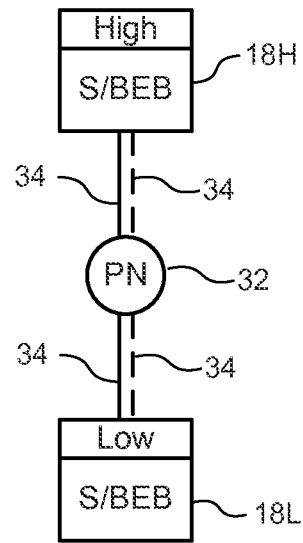

For convenience, the S/BEBs 18 may be ranked in a manner known from the aforementioned tie-breaking algorithms. Thus, for example, the S/BEB 18 having a higher Identity may be designated as the "High" S/BEB 18H, and the S/BEB 18 with the lower Identity the "Low" S/BEB 18L. Using this nomenclature, there are four possible arrangements for the top level of the two trees nominally rooted at the phantom node 32 (see FIGS. 4a-d):

1) There is a single link 34 from the root (Phantom Node 32) for each tree, and each tree's first link goes to a different one of the two S/BEB 18 (FIG. 4a);

2) There is a single link 34 from the root 32 for each tree, and each tree's first link goes to the same S/BEB 18 (the low S/BEB 18L in FIG. 4b);

3) There is a single link 34 from the root for one tree, while the other tree splits at the root 32 (FIGS. 4c); and 4) Both trees split at the root 32 (FIG. 4d).

In carefully constructed networks it may be possible to ensure that all "high" trees (dashed lines in FIGS. 4a-d) have one S/BEB 18 as their second level node, and all "low" trees (solid lines in FIGS. 4a-d) the other S/BEB 18 (see FIG. 4a) but such networks may be the exception. In general, for trees nominally rooted at the Phantom Node 32, there will usually be a partitioning of the trees; the shortest path to some destination addresses 28 will traverse one S/BEB 18, and the shortest path to other destination addresses 28 will traverse the other S/BEB 18 (FIGS. 4c and 4d).

For the arrangements of FIGS. 4b, 4c and 4d, PLSB forwarding entries and Reverse Path Forwarding Checks (RPFC) have to be installed so that ingress subscriber packets received from the CS 6 at one S/BEB 18 can be forwarded over the INT 22 to the other S/BEB 18, which can then forward the packet as if it had been received from the Phantom Node 32. By controlling each S/BEB 18 to advertise to itself that the Phantom Node 32 is one hop distant from it, and on the INT 22, IS-IS protocol will automatically install forwarding entries such that any packets received by the S/BEB 18 via the INT 22 will be forwarded/replicated over the correct path or tree, as if those packets had been received from the Phantom Node 32. This same technique will also install forwarding entries to the Phantom Node 32 on the INT 22. Of course, any packets forwarded through the INT 22 (notionally to the PN 32) will in fact traverse the INT 22 and be received by the peer S/BEB 18, where it will be processed as if it had been received from the PN 18, as described above.

Additional forwarding entries must be installed to ensure that an ingress subscriber packet received from the CS 6 is properly forwarded by the S/BEB 18, either through the appropriate path/tree to a destination BEB 28, or else (notionally) to the Phantom Node 32. For unicast forwarding, the desired behaviour is that: when the S/BEB 18 is the second node on the unicast path from the Phantom Node 32 to the destination BEB 28, then the S/BEB 18 forwards the packet (after encapsulation) as if it had arrived from the Phantom Node 32; but when the S/BEB 18 is not on the path to the destination BEB 28, then the S/BEB 18 forwards the packet (after encapsulation) across the INT 22 (notionally to the PN 32) so that it is received by the peer S/BEB 18 which must, by construction, be the second node on the path to the destination 28. For multicast forwarding/replication of ingress subscriber packets, the desired behaviour can be stated in terms of subtrees.

A tree that is notionally rooted at the PN 32 can be represented as a pair of subtrees rooted at each S/BEB 18 which perfectly divide the set of peer BEBs 18 and interior nodes in the network. From each S/BEB 18, one subtree extends through the PLSB domain 20 to one or more destination BEBs 28, while the other subtree is routed through the NT 22 to the peer S/BEB 18. Of course, for any given S/BEB 18, one or both of these subtrees may be eliminated (pruned back) based on the construction of the tree notionally rooted at the PN 32. Thus, if a tree notionally rooted at the PN 32 does not extend through a given S/BEB 18 to destination BEBs 28, then a subtree extending through the PLSB domain 20 from that S/BEB 18 would be pruned back, as would a subtree to that S/BEB 18 from a peer S/BEB 18.

For example, in the arrangement of FIG. 4a, the low tree (solid line) notionally rooted at the PN 32 traverses only the Low S/BEB 18L. Consequently, for the Low tree, the Low S/BEB 18L will install forwarding state for only one subtree, which extends through the PLSB domain 20 to one or more destination BEBs 28; while the High S/BEB 18H will install forwarding entries for only one subtree, which is directed through the NT 22 to the Low S/BEB 18L. As can be seen, this will result in all low-tree traffic being routed through the Low S/BEB 18, which follows the low tree of FIG. 4a. By contrast, in the arrangement of FIG. 4c, the high tree (dashed line) notionally rooted at the PN 32 splits at the PN 32 and traverses both peer S/BEBs 18. Consequently, for the high tree, both S/BEBs 18 will install forwarding state for two subtrees; one directed through the PLSB domain 20 to one or more destination BEBs 28, and one directed through the NT 22 to the other S/BEB 18.

With this arrangement, an ingress subscriber packet received from the CS 6 at any given S/BEB 18 can (after encapsulation including inserting the B-MAC of the PN as the root of the tree) be replicated and forwarded through the subtrees extending from that S/BEB 18, to obtain the desired multicasting behaviour.

As noted earlier, conventional PLSB processing results in the generation of two sets of paths and two sets of trees originated at the ingress BEB. The path or tree a client packet is to be tunnelled over is identified by differing Backbone V-LAN IDs (B-VIDs) included in the packet's encapsulation. The question then is which B-VID should an S/BEB 18 assign to an ingress subscriber packet during encapsulation? In carrier networks expected to support many VPNs, conventional BEB's may use the I-SID of the client service as a key to distributing client traffic over both sets of paths and trees. For example, packets with even numbered I-SIDs are assigned the B-VID for tunnelling over low paths and trees, while odd numbered I-SID packets are assigned the B-VID for tunnelling over high paths and trees. This same strategy could be applied to S/BEBs 18. However, the conventional Aggregator function 4 at the Client System 6 will normally spread the ingress subscriber traffic load across the S/BEBs 18, without reference to the I-SID. Consequently, implementing a rule in which the B-VID is assigned based upon I-SID, as in conventional systems, would result in about 50% of the ingress subscriber traffic being sent through the INT 22. Against this, the number of multicast trees that would have to be installed would be reduced (by about half) since a given I-SID can only be associated with a single B-VID. In enterprise deployments of PLSB, it is expected that there will normally be a relatively small number of trees, so that it may be more important to minimize subscriber traffic through the INT 22 and maximize load spreading through the backbone than to limit the number of trees.

One strategy for minimizing subscriber traffic through the INT 22 is to implement forwarding rules such that the low S/BEB 18L assigns the B-VID for tunnelling over the low path or tree, and the high S/BEB 18H assigns the B-VID for tunnelling over the high path or tree. Assuming that the LAG aggregator function 4 at the CS 6 yields a uniform distribution of ingress subscriber traffic across the peer S/BEBs 18, then in the arrangement of FIG. 4a, zero subscriber traffic will cross the INT 22; whereas for the arrangements of FIGS. 4b and 4d, half of the traffic must cross the INT 22; and for the arrangement of FIG. 4c, one-quarter of the traffic must cross the INT 22.

Figure 5:
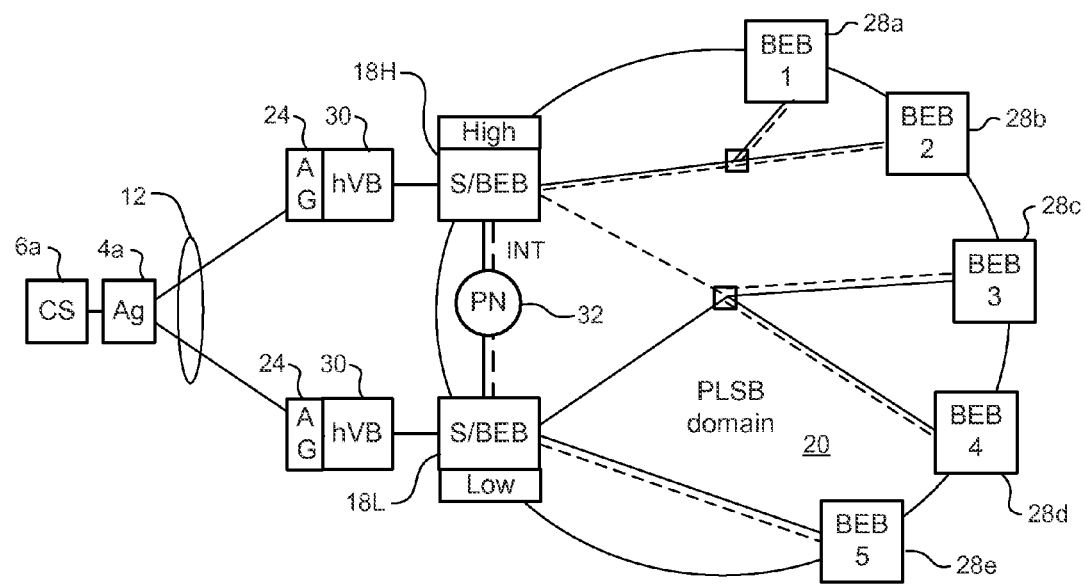
FIG. 5 is a block diagram schematically illustrating an example of trees and paths in a PLSB domain.

In the example of FIG. 5 the High S/BEB 18H has installed high tree (dashed line) forwarding table entries for BEBs 1 and 2, 28a, 28b and BEBs 3 and 4 28c, 28d on respective network ports, and a high tree forwarding table entry for BEB 5 28e on the INT 22 port, since BEB 5 28e is only reachable through the Low S/BEB 18L. The High S/BEB 18H would also install low tree forwarding table entries for BEBs 1 and 2, 28a, 28b. The Low S/BEB 18L would install forwarding table entries for both low tree and high tree traffic for BEB 5 28e, and low tree forwarding table entries for BEBs 3 and 4 28c, 28d. Following the partitioning strategy noted above, for multicast forwarding, subscriber packets received from the CS 6 at the Low S/BEB 18L will be replicated onto the low tree only. Thus, the Low S/BEB 18L will (after encapsulation) replicate the subscriber packets towards BEBs 3, 4 and 5 28c-e, and through the INT 22 to the High S/BEB 18H which has low tree forwarding entries for the subtree towards BEB's 1 and 2 28a, 28b. Similarly, for multicast forwarding, subscriber packets received from the CS 6 at the High S/BEB 18H will be replicated onto the high tree only. Thus, the High S/BEB 18H will (after encapsulation) replicate the subscriber packets towards BEBs 1-4 28a-d, and through the INT 22 to the Low S/BEB 18L which has high tree forwarding entries for the subtree towards BEB 5 28e only.

"In order" delivery of packets, a requirement for Ethernet services, is most tested when multicast packets traverse different links to their destination than those traversed by unicast packets to the same destination. The above rule ensures that multicast and unicast packets deemed by the load spreading process on the client system 6 to belong to the same conversation traverse the same path, but at the cost, as noted above of having the IS-IS process installing high and low trees for each and every I-SID. For packet forwarding services where multicast flows are quite distinct from unicast flows, and multicast is perhaps a lot less prevalent, a hybrid approach of using just the high or the low tree for multicast packets according to I-SID, but forwarding unicast packets over the path that matches the S/BEB 18 they arrived on, may be a preferable approach. For a small increase in INT 22 traffic this approach may eliminate half the trees to be installed in all BEBs.

In the normal course of operation, forwarding functions at other BEBs will learn the MAC address of the PN 32 and will encapsulate packets destined for the Client System 6 with a Backbone Destination Address (B-DA) equal to the PN's MAC address.

When a unicast packet with a B-DA of the PN 32 arrives at an S/BEB 18 the S/BEB 18 should deliver it to its local MAC Client instance 30 for passing onto its respective SLAG aggregator instance 24. Unless all the S/BEB's 18 local links to the SLAG 12 are inoperable, the packet will thus be forwarded to the client system 6 without crossing the INT 22.

If the Phantom Node 32 is a member of the set leafs of a pair of broadcast trees rooted at some other BEB of the PLSB domain 20, then it may be the case that packets replicated and forwarded over one of those trees arrive at both S/BEBs 18. Only one of the S/BEBs 18 will be on the shortest path to the PN 32 but the other S/BEB 18 might be a destination in its own right (e.g. it supports Virtual Bridges that belong to the same VPN) or it is an intermediate node on a path to other leaves. Multicast packets do not carry the destination MAC address in them, so an S/BEB 18 can not simply determine from an incoming multicast packet's header if it received it because it was the penultimate hop to the PN 32 or because it itself was a leaf of the tree or because it is an intermediate node in another branch of the tree (or, indeed, because of implementation short comings in the handling of multicast where the packet was forwarded in the expectation that it would be dropped).

The requirement for correct operation is that only one of the S/BEBs' MAC Client instance 30 should process the packet for forwarding on to the CS 6. One simple rule would be that broadcast packets arriving on High trees are only forwarded by the MAC Client instance 30 of the High S/BEB 18H, and those arriving over Low trees are only forwarded by the MAC Client instance 30 of the Low S/BEB 18L. This rule requires very little state to implement and avoids any confusion as to when to replicate broadcast packets towards the CS 6 regardless of how S/BEBs 18 are organized. However it does require both S/BEBs 18 to advertise the PN's I-SIDs with their own MAC addresses, so as to ensure that all high trees from other BEBs include the high S/BEB 18H (and low trees the low S/BEB 18L) as leaves.

An alternative strategy for egress multicast, is to control an S/BEB 18 to forward a multicast packet to its MAC Client 30 if, and only if, it would have forwarded it to the PN 32. Thus, when a S/BEB 18 calculates what trees it is a node on, and what neighbours it needs to replicate packets to, it needs to change any instances where it would replicate and forward a packet to the PN 32 into a rule to forward it to the I-SID MAC Client. With this arrangement, an S/BEB 18 would only forward multicast packets towards the client system 6 if the S/BEB 18 is the penultimate node on the path over the specific tree to the PN 32.

Assuming, for simplicity, that all User Network Interface (UNI) ports on an S/BEB 18 are split LAG ports (SLAG-ports). Then, as a MAC client 30 on an S/BEB 18, a MAC Client sees three types of ports: SLAG-ports; PB-ports (ports into the PLSB domain 20) and an INT 22 port. Note that MAC clients will exchange MAC learning information over the INT 22 in a manner analogous to that described in internet draft entitled "Split Multi-Link Trunking (SMLT)" http://tools.ietf.org/html/draft-lapuh-network-smlt-07.

For unicast packets arriving on an SLAG port of a MAC client:
  If learned egress port is another SLAG port then forward the packet to the local Distributor according to normal load splitting rules;
  If learned egress port is a PB port then encapsulate the packet as if it originated from the Phantom Node (i.e B-SA=PN B-MAC) and forward it on the S/BEBs 18 matching tree (i,e. with high B-VID if it is the High S/BEB). If the destination BEB path is through the peer S/BEB 18 then, as described above, the packet will be automatically directed out on the INT 22 port.
  If the egress port is unknown then broadcast the packet as described below.

For unicast packets arriving on an PB port of a MAC Client (from either high or low path):
  If the learned egress port is a SLAG port then forward the de-encapsulated packet to the Distributor function for the SLAG port.
  If the egress port is not known, then replicate the packet to the Distributor function of all SLAG ports. (If any Split LAG port is not operational then forward a copy of the packet over the INT 22 to the other MAC Client to be forwarded only on that MAC Client 's SLAG ports)

For unicast packets arriving over the INT 22 (as PLSB packets with B-DA =PN MAC), discard the packet, since the first S/BEB 18 to see a packet from the core should be the one to transmit it to the client system.

For broadcast and unknown packets arriving on a SLAG port:
  Broadcast onto all other SLAG ports as above. Encapsulate as for a matching (Low S/BEB, low) multicast tree originating at the Phantom Node and forward on the installed tree. As described above this will automatically include forwarding on the IST trunk if any part of the tree passes through the other S/BEB.

For broadcast packets arriving from a PB port:
  Replicate the packet to all SLAG ports. (The S/BEB 18 will only have forwarded the packet to the local MAC Client instance if there would have been a forwarding entry for the PN—i.e. the S/BEB 18 is the penultimate node on the path from the source BEB to the PN). Replicate the packet on any other PB ports (including the INT 22 port) if the S/BEB 18 has any "replicate-and-forward" entries for the tree for the port.

The S/BEB 18 should never forward multicast packets arriving over the INT 22 to its local MAC Client instance.

Advertising the Client System to the PLSB Domain Without a Phantom Node

Figure 6:
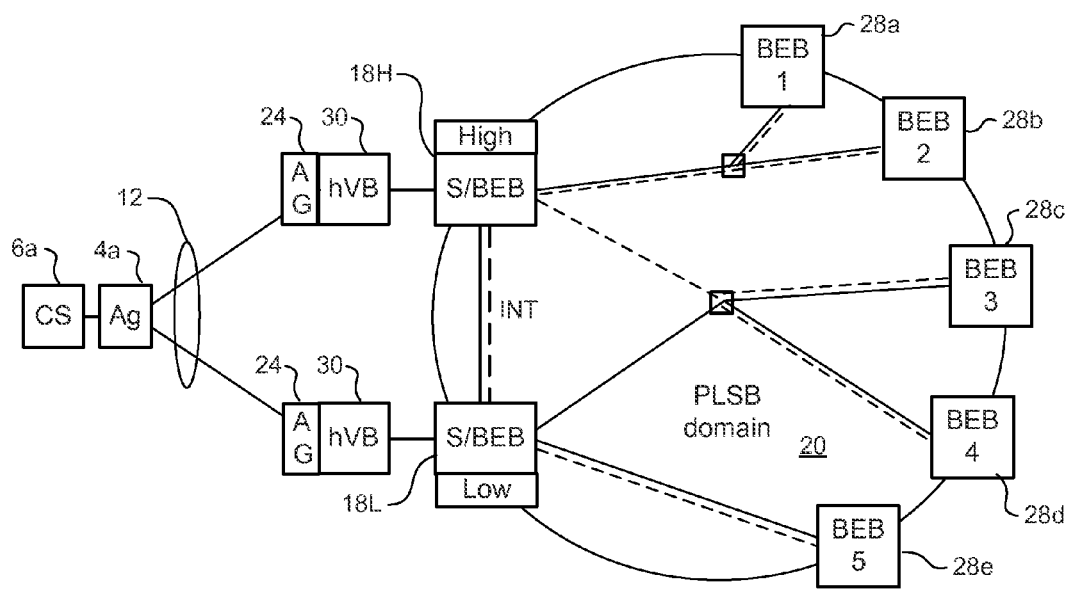
FIG. 6 is a block diagram schematically illustrating an example of trees and paths in a PLSB domain in accordance with an alternative embodiment.
Figure 7A:
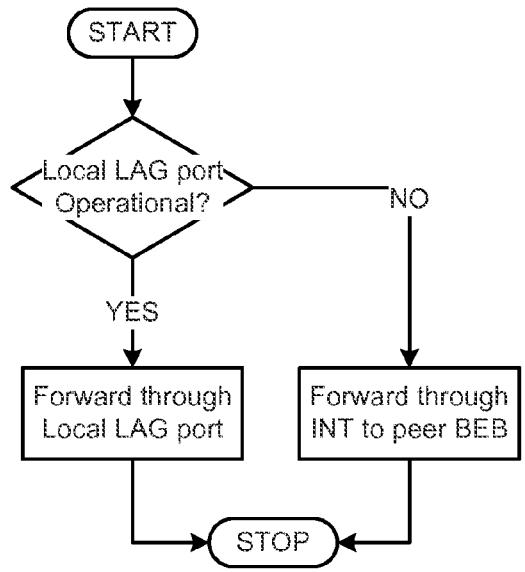
FIGS. 7a-7c are flow charts illustrating respective different processes in accordance with embodiments of the present invention.
Figure 7B:
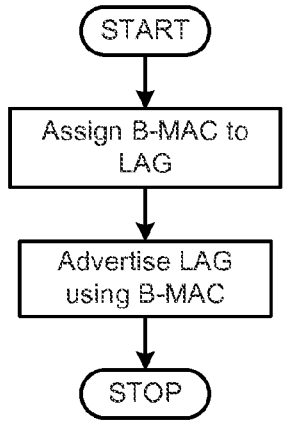
Figure 7C:
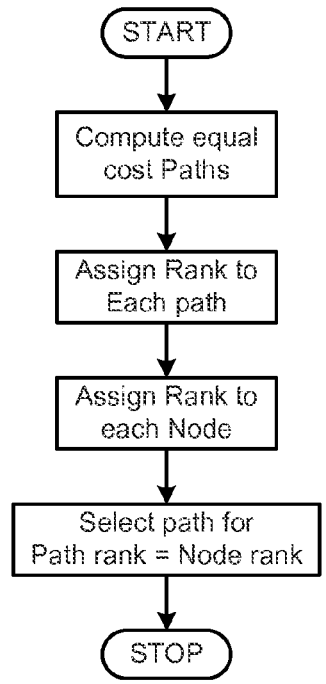

In the foregoing description, the LAG link of the Client System is represented in the PLSB domain 20 as being attached to a phantom node (PN) 32 which is notionally located on the INT 22, one hop from each S/BEB 18. Each S/BEB 18 forwards advertisement messages on behalf of the PN, so that unicast paths and multicast trees can be constructed to destination nodes in the PLSB domain 20 "as if" the PN 32 was a physical node in the PLSB domain 20. Appropriate traffic forwarding rules are then implemented in each S/BEB 18 to provide the desired packet forwarding to or from the attached Client System. FIG. 6 illustrates an alternative embodiment, in which a Phantom Node is not used. The embodiment of FIG. 6 uses a facility of PLSB to advertise so-called "Port" MACs along with node addresses and associated I-SIDs to trigger the computation of paths through the PLSB network 20 from each S/BEB 18 to other BEBs for carrying the traffic to or from the CS 6. When a Port MAC is advertised in an LSP by a node, the paths originating from that Port MAC (i.e. the paths followed by packets whose B-SA is the Port MAC) are isomorphic to the paths installed from the node. Trees are isomorphic too, subject to the I-SID pruning mentioned above.

In the embodiment of FIG. 6, each S/BEB 18 hosts a distributed MAC client instance 30 and Aggregator instances 24 in a manner similar to that described above. In this case, however, the SLAG port's assigned B-MAC address is directly advertised, as a Port MAC, by each S/BEB 18. Advertising the same Port MAC address as being hosted on multiple nodes would normally cause unpredictable packet forwarding behaviour across the PLSB network. In the embodiment of FIG. 6 the S/BEBs 18 follow a procedure to ensure that only one S/BEB 18 advertises the SLAG Port MAC address for each distinct Backbone V-LAN ID (B-VID) in operation in the PLSB network.

As described above, conventional PLSB path computation techniques can yield more than one equal-cost path or tree between a source address and any given destination address(es). Two or more such paths to each destination and related trees can be chosen, according to the aforementioned tie-breaking techniques, for installation in the forwarding tables of the intermediate switches. Each set of paths is distinguished by a separate BVID. In conventional BEBs, as described earlier various options exist for choosing which BVID, and hence which path to use for forwarding traffic. However, conventional BVID selection procedures operate independently in each BEB, whereas in order to ensure that each BVID is only selected for use by one member of the S/BEB 18 set, the BVID assignment procedure has to be coordinated across the set of S/BEBs 18. For example, a feature of Link Aggregation Groups is the physical diversity of each of the links 8 within the aggregation group, and it is desirable to retain this diversity in an extended LAG traversing the PLSB domain 20. This suggests the desirability of a BVID selection mechanism which operates so as to minimize any overlap between the respective paths selected by each of the S/BEBs 18.

One method of accomplishing this is to rank the paths extending from each S/BEB 18, and then force each S/BEB 18 to select a path based on that rank. For example, consider a scenario in which there are two S/BEBs 18, which are identified as a "high" S/BEB 18H and a "low" S/BEB 18L, and in which each S/BEB 18 hosts a respective pair of equal-cost paths (similarly identified as a "high" BVID path and a "low" BVID path). In this scenario, the BVID assignment mechanism may operate to force the low S/BEB 18L to advertise the SLAG Port MAC with the "low" BVID, and the high S/BEB 18H to advertise the SLAG Port MAC with the "high" BVID. Of course, other mechanisms to assign BVIDs uniquely to individual S/BEBs 18 may also be used, without departing from the scope of the present invention.

As may be appreciated, this arrangement enables a respective unicast path (or multicast tree) to be constructed for each link of the SLAG, thereby effectively extending the SLAG through the PLSB domain 20. Traffic forwarding in the embodiment of FIG. 6 is comparatively simple, in that ingress traffic, received by an S/BEB 18 through its local LAG port, is encapsulated with a B-VID assigned to that particular S/BEB 18 for the CS, and forwarded through the PLSB domain 20. Egress traffic received by an S/BEB 18 through the PLSB domain 20 and destined for the CS 6, is forwarded to the S/BEB's local LAG port provided that its BVID matches that assigned to the S/BEB 18. Note that all unicast traffic with a B-DA of the SLAG 12 will, under normal operation, always arrive at the S/BEB 18 which advertised the B-VID. As noted earlier, multicast traffic does not carry a destination address and there are network topologies where multicast packets tagged with other BVIDs may arrive at an S/BEB 18 for forwarding to other nodes. Under the above rule the S/BEB 18 will not forward such multicast packets towards the CS 6. Only one copy of the multicast packet will be forwarded towards the CS 6, that arriving at the S/BEB 18 with the assignment matching the packets'

BVID. With this arrangement, traffic forwarding through the INT 22 is minimized. (In that case where none of the local LAG ports are operational, the egress traffic destined for the CS 6 is forwarded through the INT 22 to a peer S/BEB 18, which forwards it to the CS 6 via its local LAG port, as described earlier).

When a CS 6 is virtualized in a proxy S/BEB 18 it treats the B-VIDs as if they were a LAG in that it will randomize the client traffic across the two of them using a load spreading technique. They will use "shared learning" (in lieu of the learning synchronization function performed by the IST) in that C-MAC to B-MAC bindings learned in one B-VID will be similarly applied to the other B-VID such that pathological "does not learn" scenarios are avoided.

In the above-described embodiments, the present invention has been described with reference to a representative embodiment in which the client system 6 is attached to the PLSB domain 20 via a pair of peer S/BEBs 18. In this embodiment, the INT 22 is considered to be a unicast connection between the involved nodes. However, it will be appreciated that the present invention is not limited to such embodiments. Rather, the described techniques can be readily applied to an attachment scheme involving more than two peer S/BEBs and a greater number of BVIDs, if desired. In this case, the INT 22 would be defined as a broadcast link, and the designation of high and low S/BEBs, paths and trees, would be extended to accommodate the increased number of S/BEBs. Such modifications are considered to be well within the purview of those of ordinary skill in the art, and are considered to fall within the scope of the present invention.

The embodiment(s) of the invention described above is(are) intended to be exemplary only. The scope of the invention is therefore intended to be limited solely by the scope of the appended claims.

We claim:

1. A non-transitory processor readable medium carrying instructions for execution by at least one processor in an edge node of a network domain for interfacing a Client System (CS) with the network domain, the CS comprising a function for load spreading packets originating from the CS across two or more attachment links and the edge node being configured to be one of a set of a plurality of peer edge nodes wherein each peer edge node in the set is associated with at least one of the two or more attachment links, the instructions comprising:

instructions executable by the at least one processor to associate at least one local part of the edge node to be used for coupling to the CS with a particular media access control (MAC) address, such that:
all ports used for coupling to the CS are associated with the particular MAC address;
packets received at a network domain port of the edge node will be forwarded toward the CS when the packets have the particular MAC address; and
packets received at the at least one local port will be forwarded to an appropriate network domain port of the edge node for transmission over the network domain; and
instructions executable by the at least one processor to arrange that each of the peer edge nodes in the set associate the same particular MAC address with respective local ports of the peer edge node to be used for coupling to the same CS.

2. The medium of claim 1, wherein the instructions executable to associate the at least one local port of the edge node with the particular MAC address comprise instructions executable to associate the at least one local port with the particular MAC address such that packets originating from the CS received at a local port of the edge node are encapsulated with a header comprising the particular MAC address, such that the encapsulated packets will be forwarded to at least one network domain port for forwarding along at least one packet transport path of the network domain.

3. The medium of claim 1, wherein the particular MAC address is a backbone MAC (B-MAC) address.

4. The medium of claim 1, comprising instructions executable to advertise the particular MAC address in the network domain.

5. The medium of claim 1, wherein the instructions executable to associate the at least one local port of the edge node with the particular MAC address comprise instructions executable to associate the at least one local port with the particular MAC address such that at least one network domain port is configured to communicate packets over at least one packet transport path to at least one further edge node of the network domain.

6. The medium of claim 5, wherein the instructions executable to associate the at least one local port of the edge node with the particular MAC address comprise instructions executable to associate the at least one local port with the particular MAC address such that at least one network domain port is configured to communicate packets over at least one packet transport path to at least one further edge node of the network domain via an intermediate node of the network domain.

7. The medium of claim 5, wherein the instructions executable to associate the at least one local port of the edge node with the particular MAC address comprise instructions executable to associate the at least one local port with the particular MAC address such that the at least one network domain port is configured to transmit unicast encapsulated packets from one network domain port for forwarding along one packet transport path to one further edge node.

8. The medium of claim 5, wherein the instructions executable to associate the at least one local port of the edge node with the particular MAC address comprise instructions executable to associate the at least one local port with the particular MAC address such that the at least one network domain port is configured to transmit multicast encapsulated packets from multiple network domain ports for forwarding along multiple packet transport paths to multiple further edge nodes.

9. The medium of claim 5, wherein the particular MAC address is a backbone MAC (B-MAC) address.

10. The medium of claim 2, wherein the header comprising the particular MAC address comprises a source address field indicating the particular MAC address.

11. The medium of claim 10, wherein the header further comprises a destination address field indicating a unicast MAC address associated with another edge node.

12. The medium of claim 10, wherein the header further comprises a destination address field indicating a multicast MAC address associated with a set of other edge nodes.

13. The medium of claim 1, wherein the instructions executable to associate the at least one local port of the edge node with the particular MAC address comprise instructions executable to associate the at least one local port with the particular MAC address such that when a packet received at a network domain port originating from another edge node includes a header comprising an encapsulation used to forward the packet over the network domain to the edge node, the encapsulation used to forward the packet over the network domain will be removed to provide a modified packet that will be forwarded toward the CS.

14. The medium of claim 13, wherein the instructions comprise instructions executable to configure the edge node to cooperate with other peer nodes in the set of the plurality of edge nodes to support a plurality of MAC client instances distributed over the peer edge nodes in the set.

15. The medium of claim 14, wherein the instructions executable to associate the at least one local port of the edge node with the particular MAC address comprise instructions executable to associate the at least one local port with the particular MAC address such that each MAC client instance is associated with a respective service instance identifier (I-SID).

16. The medium of claim 15, wherein the instructions executable to associate the at least one local port of the edge node with the particular MAC address comprise instructions executable to associate the at least one local port with the particular MAC address such that, when the encapsulation used to forward the packet over the network domain to the edge node indicates a particular I-SID, MAC client processing appropriate to the particular MAC client instance will be performed on the packet.

17. The medium of claim 1, wherein the instructions executable to associate the at least one local port of the edge node with the particular MAC address comprise instructions executable to associate the at least one local port with the particular MAC address such that he edge node is configured to operate as a Backbone Edge Bridge (BEB).

18. The medium of claim 1, wherein the instructions executable to associate the at least one local port of the edge node with the particular MAC address comprise instructions executable to associate the at least one local port with the particular MAC address such that the edge node is configured to operate as an Ethernet node.

19. The medium of claim 1, wherein the instructions executable to associate the at least one local port of the edge node with the particular MAC address comprise instructions executable to associate the at least one local port with the particular MAC address such that the edge node is configured to participate in Provider Link State Bridging (PLSB) in the network domain.

20. An edge node for interfacing a Client System (CS) with a network domain, the CS comprising a function for load spreading packets originating from the CS across two or more attachment links and the edge node being configured to be one of a set of a plurality of peer edge nodes wherein each peer edge node in the set is associated with at least one of the two or more attachment links, the edge node comprising:
   at least one local port for coupling to the CS over an associated communications link for transmission of packets to the CS and reception of packets from the CS; and
   a packet forwarding function configured to associate the at least one local port to be used for coupling to the CS with a particular media access control (MAC) address such that the packet forwarding function is configured to cooperate with packet forwarding functions of the other peer edge nodes to arrange that each of the peer edge nodes in the set associate the same particular MAC address with respective local ports of the peer edge node to be used for coupling with the same CS.

21. The edge node of claim 20, wherein the particular MAC address is a backbone MAC (B-MAC) address.

22. The edge node of claim 20, comprising an advertisement function configured to advertise the particular MAC address in the network domain.

23. The edge node of claim 20, comprising at least one network domain port configured, when coupled to a network domain comprising further edge nodes not in the set of peer edge nodes and packet transport paths for transport of packets between the edge node, the peer edge nodes and the further edge nodes, to communicate packets over at least one packet transport path to at least one further edge node.

24. The edge node of claim 23, wherein the at least one network domain port configured to communicate packets over at least one packet transport path to at least one further edge node via an intermediate node of the network domain.

25. The edge node of claim 23, wherein the packet forwarding function is configured, when coupled to the network domain via the at least one network domain port and coupled to the CS via the at least one local port:
   to receive, on the at least one local port, packets originating from the CS;
   to encapsulate the received packets with a header comprising the particular MAC address; and
   to transmit the encapsulated packets from at least one network domain port for forwarding along at least one packet transport path to at least one further edge node.

26. The edge node of claim 25, wherein the packet forwarding function is configured, when coupled to the network domain via the at least one network domain port and coupled to the CS via the at least one local port to transmit unicast encapsulated packets from one network domain port for forwarding along one packet transport path to one further edge node.

27. The edge node of claim 25, wherein the packet forwarding function is configured, when coupled to the network domain via the at least one network domain port and coupled to the CS via the at least one local port to transmit multicast encapsulated packets from multiple network domain ports for forwarding along multiple packet transport paths to multiple further edge nodes.

28. The edge node of claim 25, wherein the particular MAC address is a backbone MAC (B-MAC) address.

29. The edge node of claim 25, wherein the header comprising the particular AC address comprises a source address field indicating the particular MAC address.

30. The edge node of claim 29, wherein the header further comprises a destination address field indicating a unicast MAC address associated with one of the further edge nodes.

31. The edge node of claim 29, wherein the header further comprises a destination address field indicating a multicast MAC address associated with a set of the further edge nodes.

32. The edge node of claim 23, wherein the packet forwarding function is configured, when coupled to the network domain via the at least one network domain port and coupled to the CS via the at least one local port:
   to receive a packet on a network domain port originating from a one of the further edge nodes, the received packet having a header comprising an encapsulation used to forward the packet over the network domain to the edge node;
   responsive to receiving the packet on the network domain port, to determine when a MAC destination address field in the encapsulation used to forward the packet over the network domain indicates the particular MAC address associated with the CS; and
   responsive to determining that the MAC destination address field in the encapsulation used to forward the packet over the network domain indicates the particular MAC address:
       to remove the encapsulation used to forward the packet over the network domain from the received packet to provide a modified packet; and
       to forward toward the CS a packet comprising the modified packet.

33. The edge node of claim 32, wherein the packet forwarding function is configured to cooperate with other peer edge nodes in the set to support a plurality of MAC client instances distributed over the peer edge nodes in the set.

34. The edge node of claim 33, wherein the packet forwarding function is configured to associate each MAC client instance with a respective service instance identifier (I-SID).

35. (The edge node of claim 34, wherein, when the encapsulation used to forward the packet over the network domain to the edge node indicates a particular I-SID, the packet forwarding function is configured:
   to identify a particular MAC client instance associated with the particular I-SID; and
   to perform MAC client processing on the packet appropriate to the particular AC client instance.

36. The edge node of claim 20, wherein the edge node is configured to operate as a Backbone Edge Bridge (BEB).

37. The edge node of claim 20, wherein the at least one local port comprises a plurality of local ports, each local port for coupling to a respective communication link, the respective communication links being distinct physical circuits.

38. The edge node of claim 20, wherein the at least one local port comprises at least one Ethernet port.

39. The edge node of claim 38, wherein the Ethernet port is configured to receive native Ethernet packets.

40. The edge node of claim 39, wherein the at least one network domain port is an Ethernet port.

41. The edge node of claim 40, wherein the packet forwarding function is configured to provide Provider Link State Bridging (PLSB).

42. The edge node of claim 20, wherein the packet forwarding function comprises:
- at least one MAC client instance associated with a respective MAC address in the network domain, each MAC client instance being configured to associate its respective MAC address with a respective set of local ports to be used for coupling to a respective CS;
- at least one distributor instance coupled to the at least one MAC client instance, each distributor instance being configured to receive packets from the at least one MAC client instance and to forward the packets received from the MAC client instance toward a respective CS; and
- at least one collector instance coupled to the at least one MAC client instance, each collector instance being configured to receive packets from a respective local port and to forward the packets received from the respective local port to a respective MAC client instance.

* * * * *